US009944015B2

(12) United States Patent
Yu et al.

(10) Patent No.: US 9,944,015 B2
(45) Date of Patent: Apr. 17, 2018

(54) SYSTEM OF RAPID PROTOTYPING AND METHOD THEREOF

(71) Applicants: INVENTEC APPLIANCES (PUDONG) CORPORATION, Shanghai (CN); INVENTEC APPLIANCES CORP., New Taipei (TW); INVENTEC APPLIANCES (SHANGHAI) CO. LTD, Shanghai (CN)

(72) Inventors: Li Yu, Shanghai (CN); Shih-Kuang Tsai, Shanghai (CN)

(73) Assignees: Inventec Appliances (Pudding) Corporation, Shanghai (CN); Inventec Appliances Corp., New Taipei (TW); Inventec Applicances (Shaghai) Co. Ltd., Shanghai (CN)

( * ) Notice: Subject to any disclaimer, the term of this patent is extended or adjusted under 35 U.S.C. 154(b) by 524 days.

(21) Appl. No.: 14/577,998

(22) Filed: Dec. 19, 2014

(65) Prior Publication Data
US 2016/0082656 A1    Mar. 24, 2016

(30) Foreign Application Priority Data
Sep. 24, 2014   (CN) .......................... 2014 1 0493581

(51) Int. Cl.
*B29C 64/165*   (2017.01)
*B29C 64/205*   (2017.01)
(Continued)

(52) U.S. Cl.
CPC .......... *B29C 64/165* (2017.08); *B29C 64/141* (2017.08); *B29C 64/205* (2017.08);
(Continued)

(58) Field of Classification Search
CPC ........... B29C 67/0051; B29C 67/0055; B29C 67/0059; B29C 67/0062; B29C 67/0066;
(Continued)

(56) References Cited

U.S. PATENT DOCUMENTS

| 5,902,537 A | 5/1999 | Almquist et al. | |
| 6,155,331 A * | 12/2000 | Langer | B22C 1/00 164/15 |

(Continued)

FOREIGN PATENT DOCUMENTS

| CN | 1128966 A | 8/1996 |
| CN | 1686691 A * | 10/2005 |

(Continued)

OTHER PUBLICATIONS

Machine translation of CN-1686691-A, Aug. 1, 2017.*

(Continued)

*Primary Examiner* — Benjamin A Schiffman
(74) *Attorney, Agent, or Firm* — Muncy, Geissler, Olds & Lowe, P.C.

(57) ABSTRACT

A system of rapid prototyping, comprises a calculate controller, a stage, a deliver, a frame former, a filler and a forming machine. A board material was disposed on the stage by the deliver. The frame former heats up the board material to melt the board material and then forms at least a space on the board material. The filler fills a solidable liquid into the space. The deliver disposes another board material on the board material filled with solidable liquid and repeats the abovementioned steps until the plurality of spaces constitute the target article. And then the forming machine heats up the board materials to melt the board materials, meanwhile, the solidable liquid is solidified to form the target (Continued)

article. Wherein the calculate controller connects and operates the deliver, the frame former, the filler and the forming machine.

12 Claims, 6 Drawing Sheets

(51) Int. Cl.
    *B29C 64/295* (2017.01)
    *B29C 64/393* (2017.01)
    *B29C 64/141* (2017.01)
    *B29C 64/386* (2017.01)
    *B29L 9/00* (2006.01)
    *B33Y 30/00* (2015.01)
    *B33Y 10/00* (2015.01)

(52) U.S. Cl.
    CPC .......... *B29C 64/295* (2017.08); *B29C 64/386* (2017.08); *B29C 64/393* (2017.08); *B29L 2009/00* (2013.01); *B33Y 10/00* (2014.12); *B33Y 30/00* (2014.12)

(58) Field of Classification Search
    CPC .............. B29C 67/007; B29C 67/0074; B29C 67/0077; B29C 67/0081; B29C 67/0085; B29C 67/0088; B29C 67/0092; B29C 67/0096
    See application file for complete search history.

(56) References Cited

U.S. PATENT DOCUMENTS

| | | | | |
|---|---|---|---|---|
| 6,207,097 B1* | 3/2001 | Iverson | ............... | B29C 67/0066 264/401 |
| 7,625,512 B2* | 12/2009 | Cruz-Uribe | ......... | B29C 67/0066 264/308 |
| 9,440,397 B1* | 9/2016 | Fly | ......................... | B33Y 10/00 |
| 2002/0079601 A1 | 6/2002 | Russell et al. | | |
| 2004/0039470 A1* | 2/2004 | Gervasi | ............... | B29C 67/0066 700/119 |
| 2005/0015173 A1* | 1/2005 | Ohmori | ............... | B29C 67/0077 700/119 |
| 2014/0182775 A1* | 7/2014 | Taniuchi | ................. | B32B 37/02 156/246 |
| 2015/0314533 A1* | 11/2015 | Yu | ....................... | B29C 67/0059 264/40.1 |

FOREIGN PATENT DOCUMENTS

| | | | | |
|---|---|---|---|---|
| CN | 1686691 A | | 10/2005 | |
| CN | 101362272 A | | 2/2009 | |
| CN | 101550007 A | * | 10/2009 | |
| CN | 101550007 A | | 10/2009 | |
| CN | 103372763 A | * | 10/2013 | |
| CN | 103372763 A | | 10/2013 | |
| CN | 103950201 A | | 7/2014 | |
| TW | 114188 | | 6/1989 | |
| TW | 278374 | | 6/1996 | |
| TW | 381005 | | 2/2002 | |
| TW | I382916 | | 1/2013 | |
| WO | WO 98/15372 A1 | | 4/1998 | |
| WO | WO-9815372 A1 | * | 4/1998 | ............... B22C 9/00 |

OTHER PUBLICATIONS

Translation of CN-1686691-A, Aug. 2017 (Year: 2017).*
Gao Dong Qiang, "Research on Ceramic Material rapid manufacturing equipment and material formation based laminated quickly fixation principle", Engineering Science and Technology; 5 pages.

* cited by examiner

SYSTEM OF RAPID PROTOTYPING AND METHOD THEREOF

FIELD OF THE INVENTION

The present invention relates to a system of rapid prototyping, and in particular to a system and a method for forming a three-dimensional object through a print device.

BACKGROUND OF THE INVENTION

Three-dimensional Printing (3D printing) technology has been developed for about three decades, the prototyping of the printed object is based on a digital file, and the printed object is formed layer by layer with a pile of metal or plastic to duplicate an actual three-dimensional object. Therefore, for the objects which require the precision machining, such the manner can effectively reduce the production time and improve accuracy.

Before printing system starts to print, it needs to obtain a digital three-dimensional model of the object to be printed. Then, the three-dimensional model is divided into a plurality of sections so as to the print device can laminate the object layer by layer. The prototyping methods of the print device includes selective laser sintering, fused deposition modeling, stereo lithography, electron beam melting, laminated object manufacturing, laminated object manufacturing and so on. One of the main differences between aforementioned methods is that the selection of the materials, some of them are thermal plastic or softened plastic, and some are liquid material.

In aforementioned manner, the printing device mainly outputs the aforementioned materials to form the cross-section of the three-dimensional model layer by layer. Each droplet size of the material is calculated in microns, theoretically, a variety of three-dimensional objects with great precision can be obtained.

However, the complexity of calculation of printing path in current 3D printing systems using layering technique remains a drawback. Because of the outputted solidified material requires to support for each other to form a three-dimensional object, and the calculation also needs the algorithms for forming outer wall and extra support to complete the printing. However, the complex calculation will reduce the operation speed of the printing device and the development of calculator also requires additional expense. Since the droplet size of the outputted material is calculated in microns, it also means that the surface smoothness of the printed object is only in micron order, such that the resolution of the three-dimensional object which is formed by current 3D printing system is limited and the surface smoothness of the object is not able to meet a higher standard of smooth degrees, for example, the formation of nano-scale surface.

SUMMARY OF THE INVENTION

According to aforementioned drawbacks, the present invention provides a system of rapid prototyping and the method thereof, which uses the thermal fuse material and filling liquid configuration material to achieve the three-dimensional printing system requires lower complexity of calculation.

The present invention further provides a rapid prototyping system which includes a delivering device that is provided for moving and disposing a board, a frame forming device that is provided for heating and melting an area of the board to form a space on the board, a filling device that is provided for filling a thermosetting material into the space, a forming device that is provided for heating the board with the filled thermosetting material therein to melt the board and solidifying the thermosetting material, and a calculating controller that is provided for electrically connected to the delivering device, the frame forming device, the filling device and the forming device and is provided for controlling the operation for the delivering device, the frame forming device, the filling device and the forming device.

In addition, the present invention also provides a rapid prototyping method which includes the steps of disposing a first hot-meltable board on a stage, heating and melting a first area on the first hot-meltable board to form a first space on the first hot-meltable board, filling a first thermosetting material into the first space, disposing a second hot-meltable board on the first hot meltable board, heating and melting a second area on the second hot-meltable board to form a second space on the second hot-meltable board, wherein the second space is connected with the first space, filling a second thermosetting material into the second space, then the first hot-meltable board and the second hot-meltable board are heated and melted, meanwhile the first and second thermosetting material are solidified.

The present invention also provides a rapid prototyping method which includes the steps of a first hot-meltable board is provided, a first area on the first hot-meltable board is heated and melted to form a first space on the first hot-meltable board, a second hot-meltable board is disposed on the first hot-meltable board, a second area on the second hot-meltable board is heated and melted to form a second space on the second hot meltable board, in which the second space connected with the first space, a thermosetting material is filled into the first space and the second space and the first hot-meltable board and the second hot-meltable board are heated and melted and the thermosetting material is solidified at the same time.

According to aforementioned, the rapid prototyping system of the present invention utilizes the thermal fuse material to form a frame and the liquid configuration material so as to achieve the formation of the object through the calculation method with lower requirement of hardware and software for rapid prototyping system and the formation time of three-dimensional object are reduced and the cost of the formation of three-dimensional object is also reduced.

Furthermore, forming the object with the thermal fused frame and the liquid configuration material can achieve better object surface resolution than that of laminated with the solid materials.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

The present invention is related to a rapid prototyping system and the method thereof, which is a three-dimensional (3D) printing system for forming a three-dimensional object. The present invention mainly provides a rapid prototyping method which is different from the current 3D printing method. The required calculation or the apparatus configuration for the system is not the important feature of the present invention and it is not to be described in detail herein.

Figure 1:
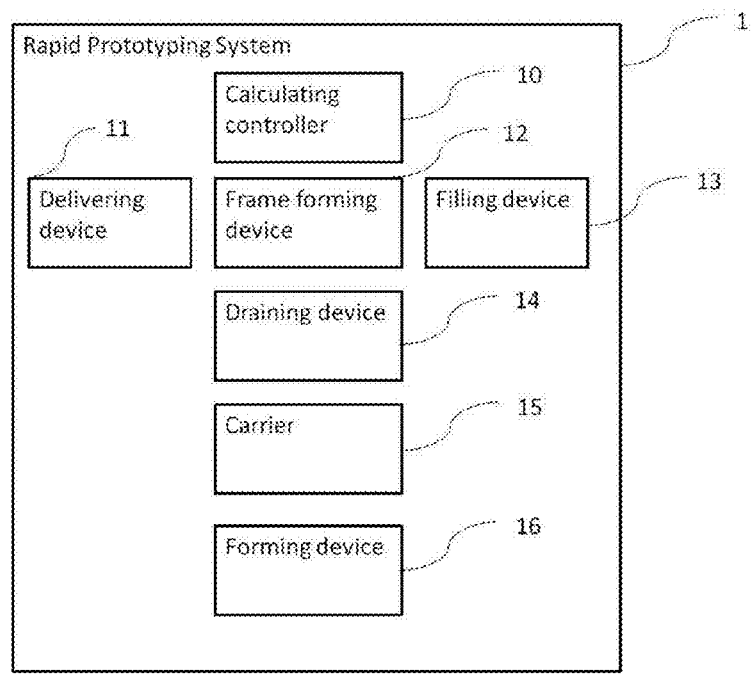
FIG. 1 is a block diagram of rapid prototyping system in accordance with the present invention.

Please refer to FIG. 1. FIG. 1 is a block diagram showing a rapid prototyping system. As shown in FIG. 1, the rapid prototyping system 1 of the present invention includes a calculating controller 10, a delivering device 11, a frame forming device 12, a filling device 13, a draining device 14, a carrier 15 and a forming device 16. The calculating controller 10 can be a computer, and the calculating controller 10 is electrically connected with the delivering device 11, the frame forming device 12, the filling device 13, the draining device 14 and the forming device 16. The calculating controller 10 emits a controlling signal for controlling the delivering device 11, the frame forming device 13, the draining device 14 and the forming device 16. In one embodiment of the present invention, an object model 3' of an object is obtained by the calculating controller 10 through scanning or computer drafting. The size of the object model 3' relative to that of the actual object can be scaled down or enlarge. Then, the calculating controller 10 is provided for analyzing to obtain a plurality of different sectional surfaces of the object model 3'. Please refer to FIG. 2. According to the analysis of the calculating controller 10, the object model 3' is delaminated into a plurality of sectional surfaces $2a$, $2b$, $2c$, . . . , $2z$ from bottom to the top. As shown in FIG. 3, each the plurality of sectional surfaces $2a$, $2b$, $2c$, . . . , $2z$ have the outlines $22a$, $22b$, $22c$, . . . , $22z$ of the cross-section of the aforementioned objects. Obviously, if each the plurality of sectional surfaces $2a$, $2b$, $2c$, . . . , $2z$ are stacked in sequence, then each outlines $22a$, $22b$, $22c$, . . . , $22z$ are connected to form a frame of the object model 3'.

Figure 2:
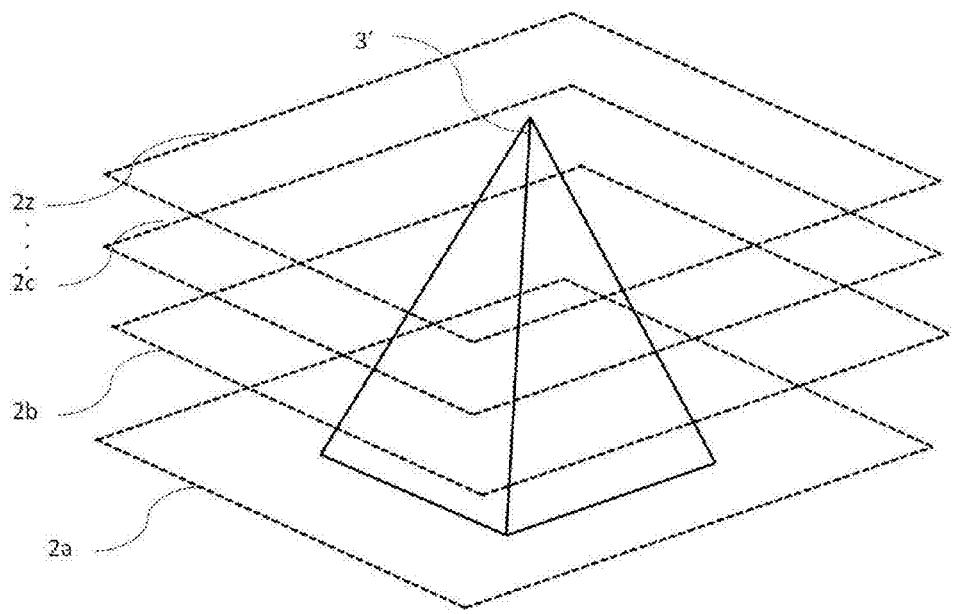
FIG. 2 is a schematic of showing an object modeling with different cross-sectional view of the first embodiment in accordance with the present invention.
Figure 3:
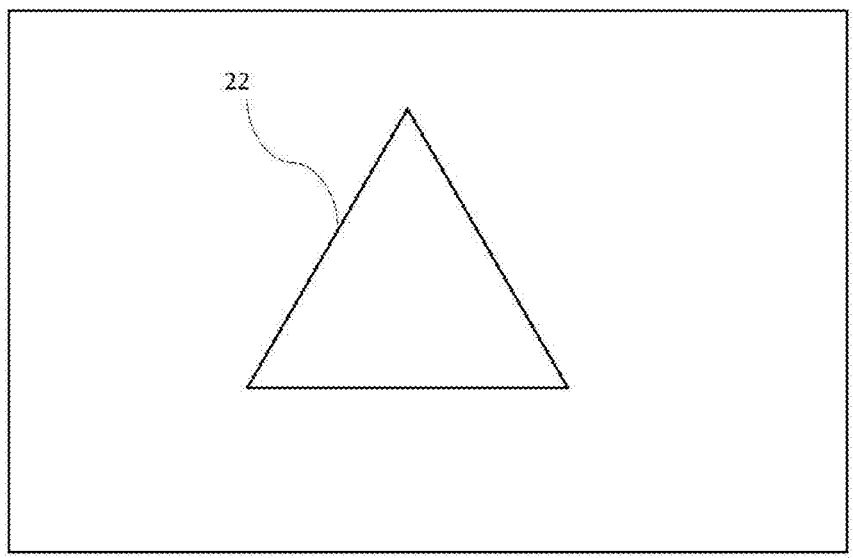
FIG. 3 is cross-sectional view of showing an object modeling of the first embodiment in accordance with the present invention.
Figure 4:
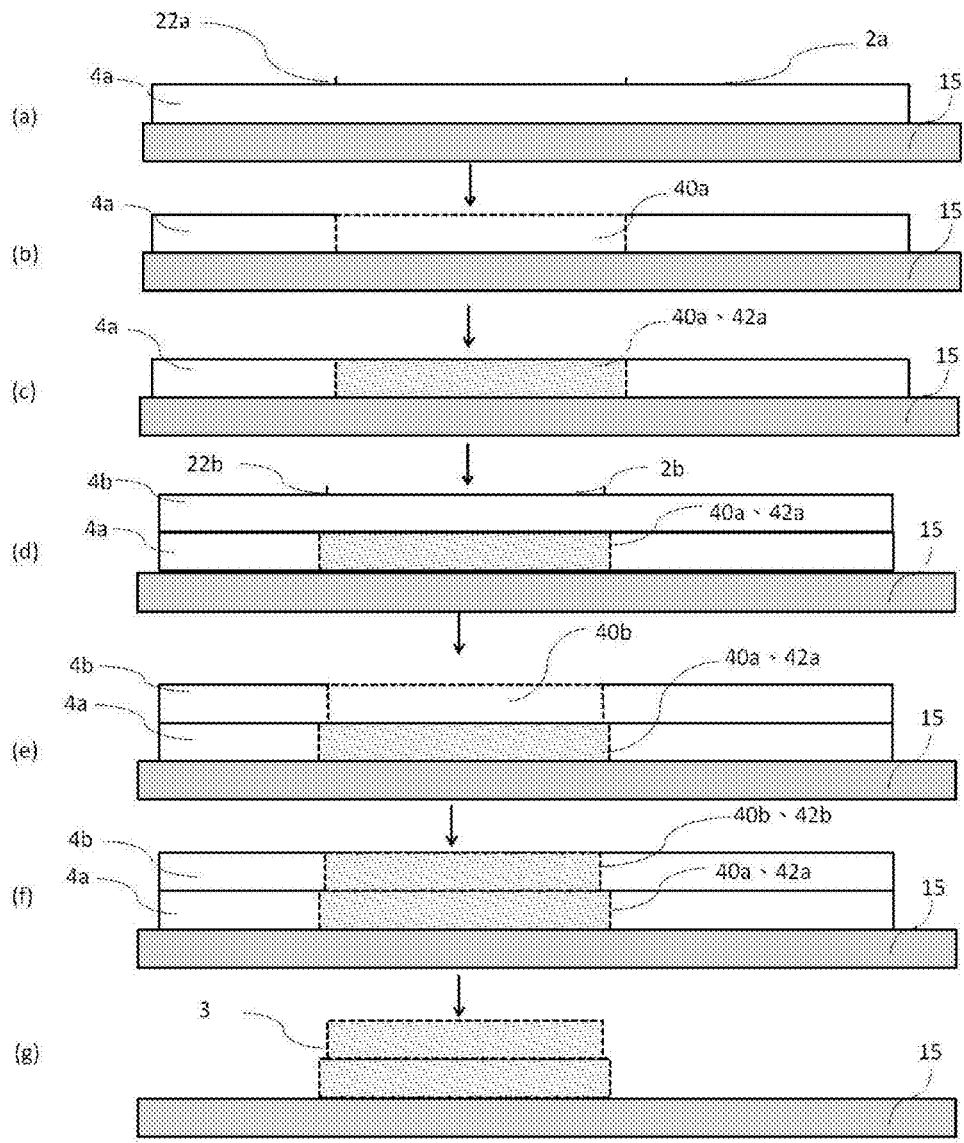
FIG. 4 is a cross-sectional view of the consecutive state of rapid prototyping of the first embodiment in accordance with the present invention.

Please also refer to FIG. 2, FIG. 3, and FIG. 4. FIG. 4 is a cross-sectional view of the consecutive state of rapid prototyping of the first embodiment in accordance with the present invention. After the plurality of sectional surface of the object model 3' is obtained, the delivering device 11 is provided for disposing a board $4a$ with solid state on a carrier 15, in which the delivering device 11 is disposed above the carrier 15 and has a capability of performing three-dimensional movement. In this embodiment, the material of hot-meltable board $4a$ is thermal fusible, for example, the material of hot-meltable board $4a$ is made of gellan gum or wax. As the state (a) of FIG. 4, after the hot-meltable board $4a$ is disposed on the carrier 15, the hot-meltable board $4a$ is heated and an area of the hot-meltable board $4a$ is molten to form a space $40a$ on the board $4a$ by the frame forming device 12 according to one of the sectional surface $2a$ on the outline $22a$ of the object model 3' as the state (b) of FIG. 4. In above embodiment, the frame forming device 12 is disposed above the carrier 15, and has a capacity of performing three-dimensional movement. The frame forming device 12 is a point-heating device for heating the hot-meltable board $4a$, and the detail mechanical structure of the frame forming device 15 is not limited in this invention. In addition, the hot-meltable board $4a$ is to be melted into liquid after heated, and the liquid is drained out by the draining device 14. In one of the embodiment, the draining device 14 is disposed above the carrier 15 and has a capacity of performing three-dimensional movement. After the space $40a$ is formed on the hot-meltable board $4a$, the draining device 14 is moved to the space $40a$ to drain out the liquid therein, for example, the liquid is drained out by suction. In other embodiment, the draining device 14 is disposed above the carrier 15, and the draining device is a drain hole with switch. When the hot-meltable board $4a$ is heated and melted into liquid, the switch is turned on to drain out the liquid from the draining device 14, and the detail mechanical structure of the draining device 14 is not described herein. In above embodiment, the material of hot-meltable board $4a$ is gellan gum or wax.

As the state (b) of FIG. 4, after the space $40a$ is formed on the hot-meltable board $4a$, as the state (c) of FIG. 4, a forming liquid $42a$ is filled into the space $40a$ by the filling device 14, the forming liquid $42a$ such as the egg white, starch solution, cyanoacrylate or silicon. The filling device 13 is disposed above the carrier 15 and has a degree of freedom of three-dimensional movement. Then, as the state (d) of FIG. 4, after the forming liquid $42a$ fills the space $40a$, another hot-meltable board $4b$ is stacked on the hot-meltable board $4a$ by the delivering device 11 and the sectional surface $2b$ is projected to the hot-meltable board $4b$ after stacked. Next, as the state (e) of FIG. 4, the area which is enclosed by the outline $22b$ on the hot-meltable board $4b$ is heated and melted by the frame forming device 12 to form a space $40b$. Also, as the state (f) of FIG. 4, the forming material $42b$ is filled into the space $40b$. Finally, the stacked hot-meltable board $4a$ and $4b$ with the forming liquids $42a$, $42b$ is heated by the forming device 16 to melt the stacked hot-meltable board $4a$ and $4b$ and solidify the forming liquids $42a$, $42b$ as shown in the state (g) of FIG. 4. The solidified forming liquids $42a$, $42b$ will be formed an object that is identical to the object model 3'. In another embodiment, when the object model 3' is delaminated into the sectional surfaces $2a$-$2z$, the rapid prototyping system 1 of the present invention can sequentially stack the hot-meltable board $4a$ with sectional surface $2a$, the hot-meltable board $4b$ with sectional surface $2b$, . . . , and the hot-meltable board $4z$ with sectional surface $2z$. Meanwhile, each space $40a$, $40b$, . . . , $40z$ on each hot-meltable boards $4a$, $4b$, . . . , $4z$ are connected and the forming liquids $42a$, $42b$, . . . , $42z$ are filled into the spaces $40a$, $40b$, . . . $40z$. Finally, the hot-meltable boards $4a$, $4b$, . . . , $4z$ are heated and melted and the forming liquid $42a$, $42b$, . . . , $42z$ are solidified to obtain an object 3 that is identical to the object model 3'.

Figure 5:
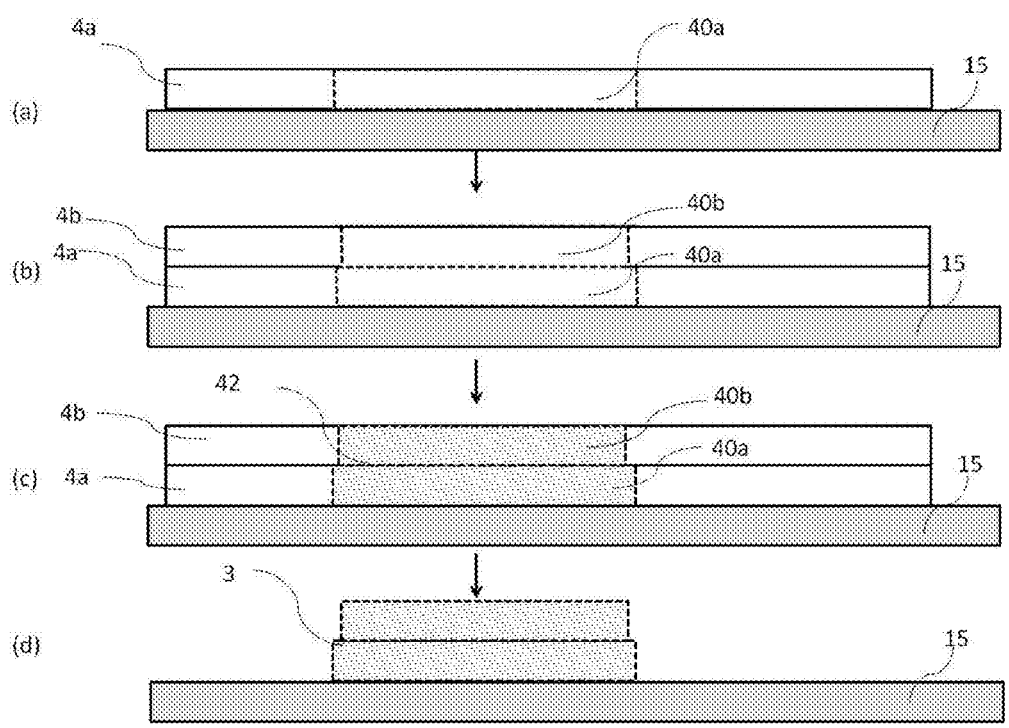
FIG. 5 is a cross-sectional view of the consecutive state of rapid prototyping of the second embodiment in accordance with the present invention.

Please refer to FIG. 2, FIG. 3, and FIG. 5. is a cross-sectional view of the consecutive state of rapid prototyping of the second embodiment in accordance with the present invention. As the state (a) of FIG. 5, after the space $40a$ is formed on the hot-meltable board $4a$, the liquid which is formed by heated and melted is drained out, and the forming liquid 42 is not filled into the space $40a$. But as the state (b) of FIG. 5, the hot-meltable board $4b$ is stacked on the hot-meltable board $4a$ and a space $40b$ is formed on the hot-meltable board $4b$. Now, the space $40a$ is intercommunicated with the space 40b as the state (c) of FIG. 5. The forming liquid 42 is filled into the space 40a which is intercommunicated with the space 40b. Also as the state (d) of FIG. 5, the stacked hot-meltable boards 4a, 4b are heated to melt and the forming liquid 42 in the space 40a intercommunicated with the space 40b is solidified by the forming device 16 to obtain an object 3. In another embodiment, when the object model 3' is delaminated into the plurality of sectional surfaces 2a, 2b, . . . , 2z, the rapid prototyping system 1 can sequentially stack the hot-meltable board 4a with the sectional surface 2a, the hot-meltable board 4b with the sectional surface 2b, . . . , the hot-meltable board 4z with the sectional surface 2z respectively. Now, each spaces 40a, 40b, . . . , 40z on each hot-meltable boards 4a, 4b, . . . , 4z are intercommunicated with each other, and the forming liquid 42 is filled into the communicated spaces 40a, 40b, . . . , 40z. Then the hot-meltable boards 4a, 4b, . . . , 4z are heated and melted and the forming liquid 42 is solidified to obtain the object 3 that is identical to the object model 3'. In another embodiment of the present invention, the partial spaces 40a, 40b, . . . , 40z which are formed on the hot-meltable boards 4a, 4b, . . . , 4z are disposed above the carrier 15 with the draining device 14, and the hot-meltable boards 40a, 40b, . . . , 40z are moved to another area above the carrier 15 by the delivering device 11 to stack each other after the liquid is drained out. The above embodiments can prevent the hot-meltable boards 4a, 4b, . . . , 4z to bland with the uncured forming liquid 42.

Figure 6:
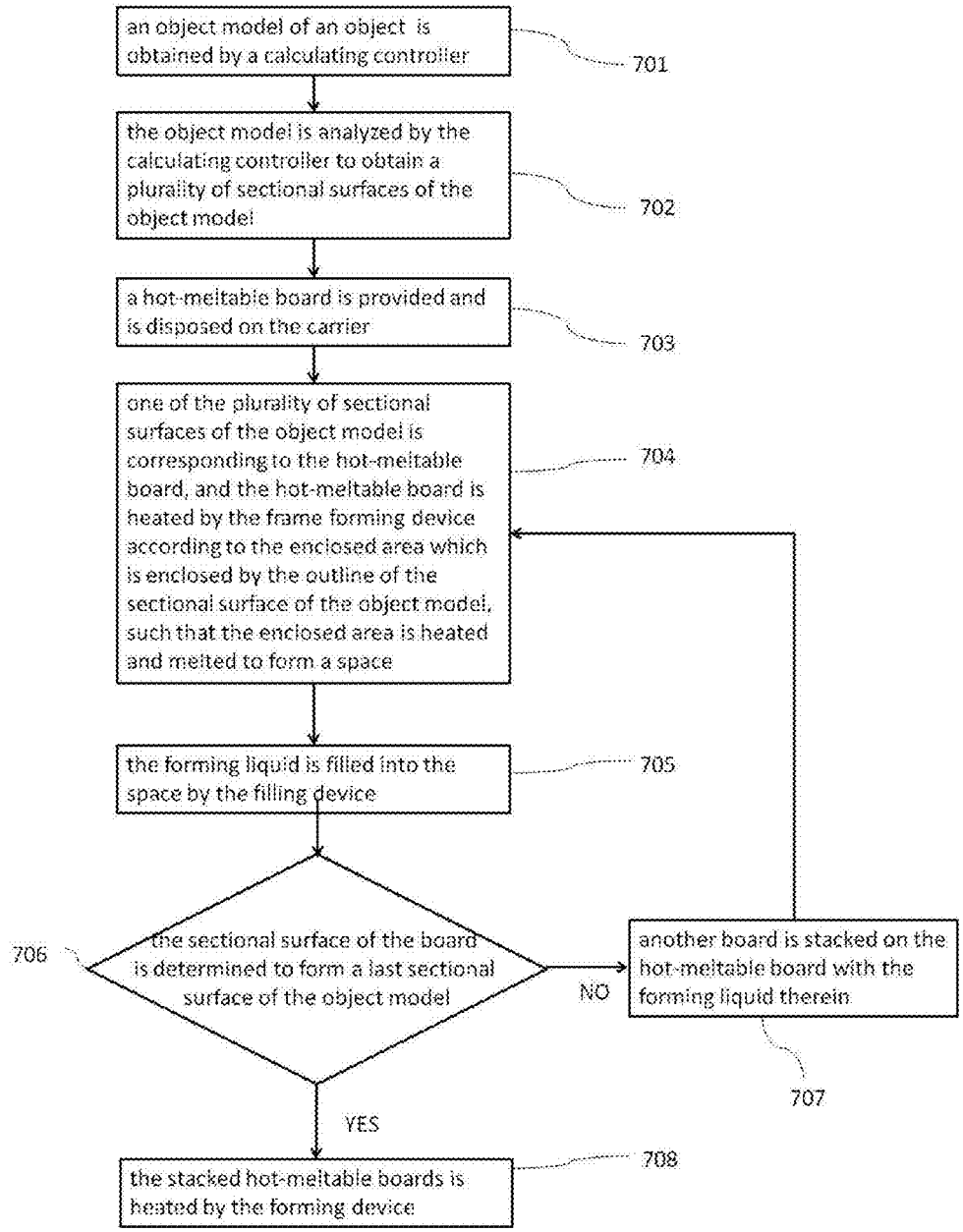
FIG. 6 is a flow diagram of the rapid prototyping method of the first embodiment in accordance with the present invention.

Please also refer to FIG. 1, FIG. 4 and FIG. 6. FIG. 6 is a flow diagram of the rapid prototyping method of the first embodiment in accordance with the present invention. According to above rapid prototyping system 1, the present invention also provides a rapid prototyping method, as shown in FIG. 6. The rapid prototyping method includes the steps of following:

Step 701: an object model 3' of an object 3 (as shown in FIG. 2) is obtained by a calculating controller 10, in which the obtaining method is scanning or computer drafting.

Step 702: the object model 3' is analyzed by the calculating controller 10 to obtain a plurality of sectional surfaces of the object model 3' as the reference numbers 2a, 2b, . . . , 2z in FIG. 2, in which each the plurality of sectional surfaces has outlines of the object sectional surface as the reference numbers 22a, 22b, . . . , 22z in FIG. 2.

Step 703: as shown in FIG. 4, a hot-meltable board 4a is provided and is disposed on the carrier 15.

Step 704: one of the plurality of sectional surfaces 2a of the object model 3' is corresponding to the hot-meltable board 4a, and the hot-meltable board 4a is heated by the frame forming device 12 according to the enclosed area which is enclosed by the outline 22a of the sectional surface 2a of the object model 3', such that the enclosed area is heated and melted to form a space 40a, in which after the space 40a is formed, the liquid which is formed by heating and melting the hot-meltable board 4a and is further drained out by the draining device 14.

Step 705: the forming liquid 42a is filled into the space 40a by the filling device 13, and the forming liquid 42a is a thermosetting liquid such as the egg white, starch solution, cyanoacrylate or silicon. In one of the embodiment, the space 40a is formed on the hot-meltable board 4a by the frame forming device 13 when the hot-meltable board 4a is disposed on one area of the carrier 15 and the hot-meltable board 4a is moved to another area to fill with the forming liquid 42a.

Step 706: the sectional surface 2a of the board 4a is determined to form a last sectional surface 2a of the object model, if yes, the step 707 is performed, otherwise, the step 708 is performed.

Step 707: as shown in FIG. 4, another board 4b is stacked on the hot-meltable board 4a with the forming liquid 42a therein, and the steps 704~706 are repeated. The sectional surface of the object model 3' is sequentially corresponding to the different hot-meltable boards 4a, 4b, . . . , 4z from the bottom to the top. For example, the hot-meltable board is sequentially stacked through the hot-meltable board 4a, the hot-meltable board 4b, . . . , the hot-meltable board 4z. The sectional surface 2a, the sectional surface 2b, . . . , and the sectional surface 2z of the object model 3' is corresponding to the hot-meltable board 4a, the hot-meltable board 4b, . . . , and the hot-meltable board 4z respectively. Each sectional surfaces 2a, 2b, . . . , 2z are corresponding to each outlines 22a, 22b, . . . , 22z which are enclosed to form a first area, a second area, . . . , a Zth area on the hot-meltable boards 4a, 4b, . . . , 4z respectively. The enclosed first area, the enclosed second area, . . . the enclosed Zth area are heated and melted to form a spaces 40a, 40b, . . . , 40z so as to the forming liquids 42a, 42b, . . . , 42z are filled into the spaces 40a, 40b, . . . , 40z respectively.

Step 708: the stacked hot-meltable boards is heated to melt by the forming device 16 and the forming liquids 42a, 42b, . . . , 42z are solidified.

Figure 7:
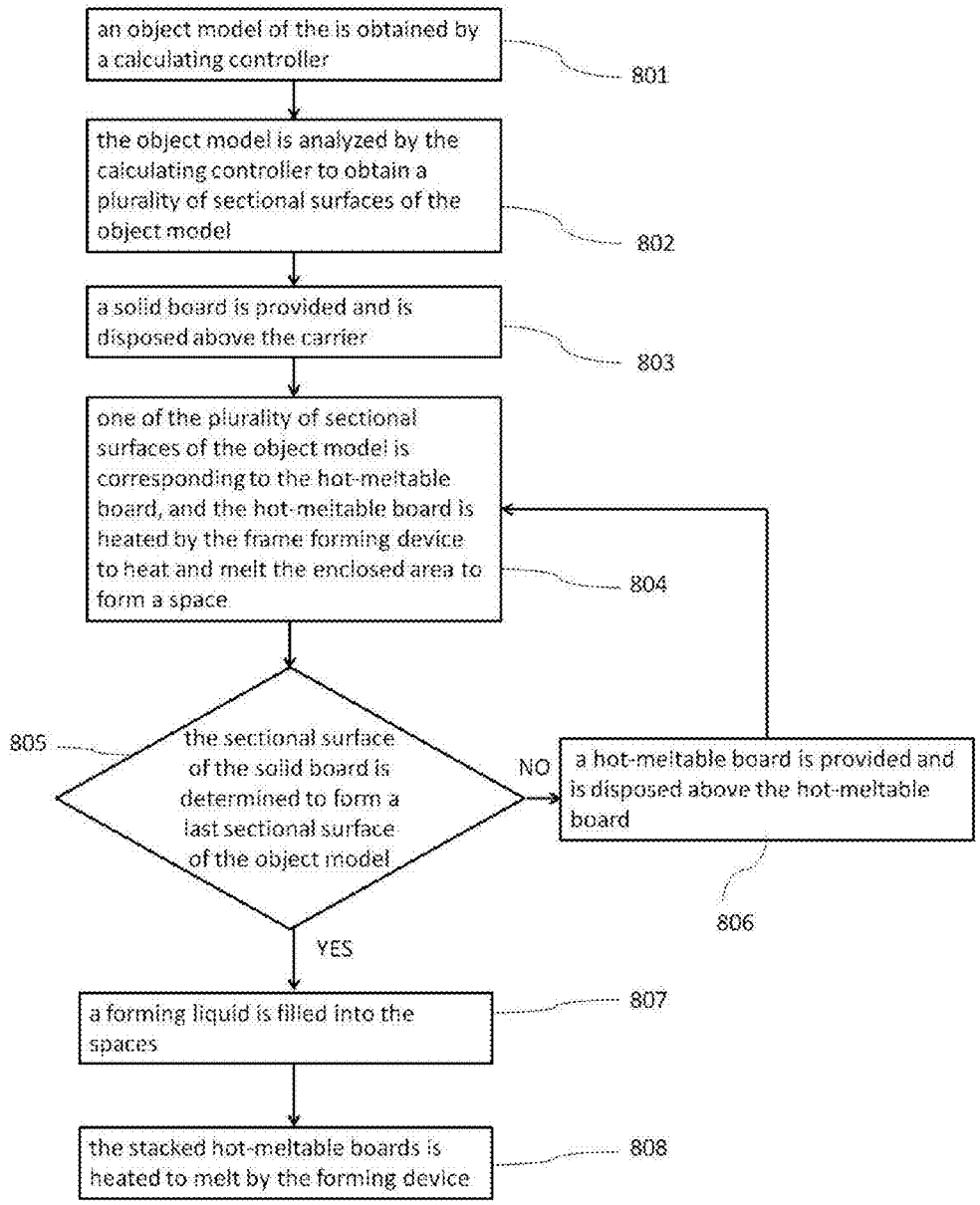
FIG. 7 is a flow diagram of the rapid prototyping method of the second embodiment in accordance with the present invention.

Then, please refer to FIG. 1, FIG. 5, and FIG. 7. FIG. 7 is a flow diagram of the rapid prototyping method of the second embodiment in accordance with the present invention. According to above rapid prototyping system 1, the present invention provides a rapid prototyping method as shown in FIG. 7. The rapid prototyping method includes the steps of following:

Step 801: an object model 3' of the object (as shown in FIG. 2) is obtained by a calculating controller 10, in which the obtain method is scanning or computer drafting.

Step 802: the object model 3' is analyzed by the calculating controller 10 to obtain a plurality of sectional surfaces of the object model 3' as the reference numbers 2a, 2b, . . . , 2z in FIG. 2, in which each sectional surfaces has outline of the sectional surface of the object as the reference numbers 22a, 22b, . . . , 22z in FIG. 2 respectively.

Step 803: As shown in FIG. 4, a solid board 4a is provided and is disposed above the carrier 15, in which the material of the solid board 4a is capable of heating and melting.

Step 804: one of the plurality of sectional surfaces 2a of the object model 3' is corresponding to the hot-meltable board 4a, and the hot-meltable board 4a is heated by the frame forming device 12 to heat and melt the enclosed area to form a space 40a, and the enclosed area is enclosed by the outline 22a of the sectional surface 2a of the object model 3'. After the space 40a is formed, the liquid which is formed by heating and melting the hot-meltable board 4a is further drained out by the draining device 14.

Step 805: the sectional surface 2a of the solid board 4a is determined to form a last sectional surface 2a of the object model 3', if yes, the step 806 is performed, otherwise, the step 807 is performed.

Step 806: as shown in FIG. 5, a hot-meltable board 4b is provided and is disposed above the hot-meltable board 4a and the step 805 is repeated. The sectional surface of the object model 3' is sequentially corresponding to the different hot-meltable boards 4a, 4b, . . . , 4z from bottom to the top respectively. For example, the hot-meltable board is sequentially stacked by the hot-meltable boards 4a, 4b, . . . 4z, and the sectional surfaces 2a, 2b, . . . , 2z of the object model 3' are corresponding to the hot-meltable boards 4a, 4b, ..., 4z respectively. A first area, a second area, ... a Zth area is enclosed on the hot-meltable boards 4a, 4b, ..., 4z by each sectional surfaces 2a, 2b, ..., 2z are corresponding to the outlines 22a, 22b, ..., 22z of the object 3. The enclosed first area, the enclosed second area, ..., the enclosed Zth area are heated and melted to form a spaces 40a, 40b, ..., 40z respectively.

Step 807: a forming liquid 42 is filled into the spaces 40a, 40b, ..., 40z, in which the spaces 40a, 40b, ..., 40z are connected to each other and thus the forming liquid 42 can fill into all of the spaces 40a, 40b, ..., 40z at a time.

Step 808: the stacked hot-meltable boards is heated to melt by the forming device 16 and the forming liquid is solidified.

In above different embodiments, both the frame forming device 12 and the filling device 13 can move in three-dimensional direction and the frame forming device 12, and the filling device 13, the draining device 14 and the forming device 16 are controlled to operate by the calculating controller 10. In addition, the forming device 16 is a heating device for heating the hot-meltable board 4a, 4b, ..., 4z on the carrier 15 and the forming liquid 42, 42a, 42b, ..., 42z at the same time. For example, the electric calorific installation is disposed under the carrier 15 and the type of the forming device 16 is not limited in this invention.

In above embodiment, when the forming liquids 42, 42a, 42b, ..., 42z are thermosetting material, the melting point of the hot-meltable boards 4a, 4b, ..., 4z are higher than the temperature of the forming liquids 42, 42a, 42b, ..., 42z. Thus, when the hot-meltable boards 4a, 4b, ..., 4z with the forming liquids 42, 42a, 42b, ..., 42z therein respectively are heated, the forming liquids 42, 42z, 42b, ..., 42z are first solidified, and the hot-meltable board 4a, 4b, ..., 4z are then heated and melted. In one embodiment, the melting point of the hot-meltable boards 4a, 4b, ..., 4z are in ranges from 60° C. to 130° C. and the solidification temperature of the forming liquids 42, 42a, 42b, ..., 42z are in range from 50° C. to 120° C. In addition, when the forming liquids 42, 42a, 42b, ..., 42z are a thermosetting colloid, the forming liquids 42, 42a, 42b, ..., 42z are solidified during the hot-meltable boards 4a, 4b, ..., 4z are heated and melted and the heating process will not affect the solidified forming liquids 42, 42a, 42b, ..., 42z.

According to the rapid prototyping system and the method, to compare the present invention with the current object forming device, even the calculating controller 10 is still provided a forming path for the operation of the forming element but the object is directly formed by the solid or semi-solid material thorough the current object forming device. Thus, the calculation for the formation of outer wall and material supported for each other are still required. In contrast, the present invention utilizes the liquid to fill the modeling which is formed by the board so as to the simple calculation can apply for the formation of object.

According to the rapid prototyping system and method contrast to the current object forming device with solid ink stacking to form an object, the present invention heats and melts the board to form a frame and fills the forming liquid into the frame. Thus, the rapid prototyping system and method has better resolution, such as the surface is more smoothness.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A system of rapid prototyping, comprising:
 a calculating controller, which obtains an object model of an object by scanning or computer drafting the object, and analyzes the object to obtain a plurality of a different sectional surface of the object model;
 a delivering device which moves and disposes a board;
 a frame forming device which heats and melts an area of the board, such that the area of the board forms a space according to the plurality of different sectional surfaces of the object model;
 a filling device which fills a thermosetting material into the space on the board;
 a forming device which heats and melts the board with the thermosetting material thereon and solidifies the thermosetting material;
 a draining device, which drains out the liquid which is formed by melting the board; and
 the calculating controller electrically connected to the delivering device, the frame forming device, the filling device and the forming device to control the delivering device, the frame forming device, the filling device and the forming device.

2. The system of claim 1, wherein the draining device is electrically connected to the calculating controller.

3. The system of claim 1, wherein the melting temperature of the board ranges between 60 Celsius degree and 130 Celsius degree.

4. The system of claim 1, wherein the board is made of one of the gellan gum and wax.

5. The system of claim 1, wherein the solidification temperature of the thermosetting material is lower than the melting temperature of the board.

6. The system of claim 1, wherein the thermosetting material is one of egg white, starch solution, cyanoacrylate and silicone.

7. A method of rapid prototyping, comprising the steps of:
 disposing a first hot-meltable board on a stage;
 heating and melting a first area on the first hot-meltable board to form a first space on the first hot-meltable board;
 filling a first thermosetting material into the first space;
 disposing a second hot-meltable board on the first hot-meltable board;
 heating and melting a second area on the second hot-meltable board to form a second space on the second hot-meltable board;
 filling a second thermosetting material into the second space; and
 heating and solidifying the first and second thermosetting material, and heating up to melt the first hot-meltable board and the second hot-meltable board.

8. The method of claim 7, further comprising the step of:
 draining the melted hot-meltable board in the first space and the second space.

9. The method of claim 7, wherein the step of heating and melting a first area on the first hot-meltable board comprises the steps of:
 obtaining an object model; and
 analyzing the object model to obtain a plurality of cross sections of the object model;
 wherein each of the cross sections has a contour of the object model, the contour of a first cross section of the object model surrounds and defines the first area on the first hot-meltable board, while the contour of a second cross section of the object model surrounds and defines the second area on the second hot-meltable board.

10. A method of rapid prototyping, comprising the steps of:
  disposing a first hot-meltable board;
  heating and melting a first area on the first hot-meltable board to form a first space on the first hot-meltable board;
  disposing a second hot-meltable board on the first hot-meltable board;
  heating and melting a second area on the second hot-meltable board to form a second space on the second hot-meltable board, wherein the second space connects with the first space;
  filling a thermosetting material into the first space and the second space; and
  heating and solidifying the thermosetting material, and then heating up to melt the first hot-meltable board and the second hot-meltable board.

11. The method of claim 10, further comprising the step of:
  draining the melted hot-meltable board in the first space and the second space.

12. The method of claim 10, wherein the step of heating and melting a first area on the first hot-meltable board comprises the steps of:
  obtaining an object model; and
  analyzing the object module to obtain a plurality of cross sections of the object model;
  wherein each of the cross sections has a contour of the object model, the contour of a first cross section of the object model surrounds and defines the first area on the first hot-meltable board, while the contour of a second cross section of the object model surrounds and defines the second area on the second hot-meltable board.

* * * * *